UNITED STATES PATENT OFFICE.

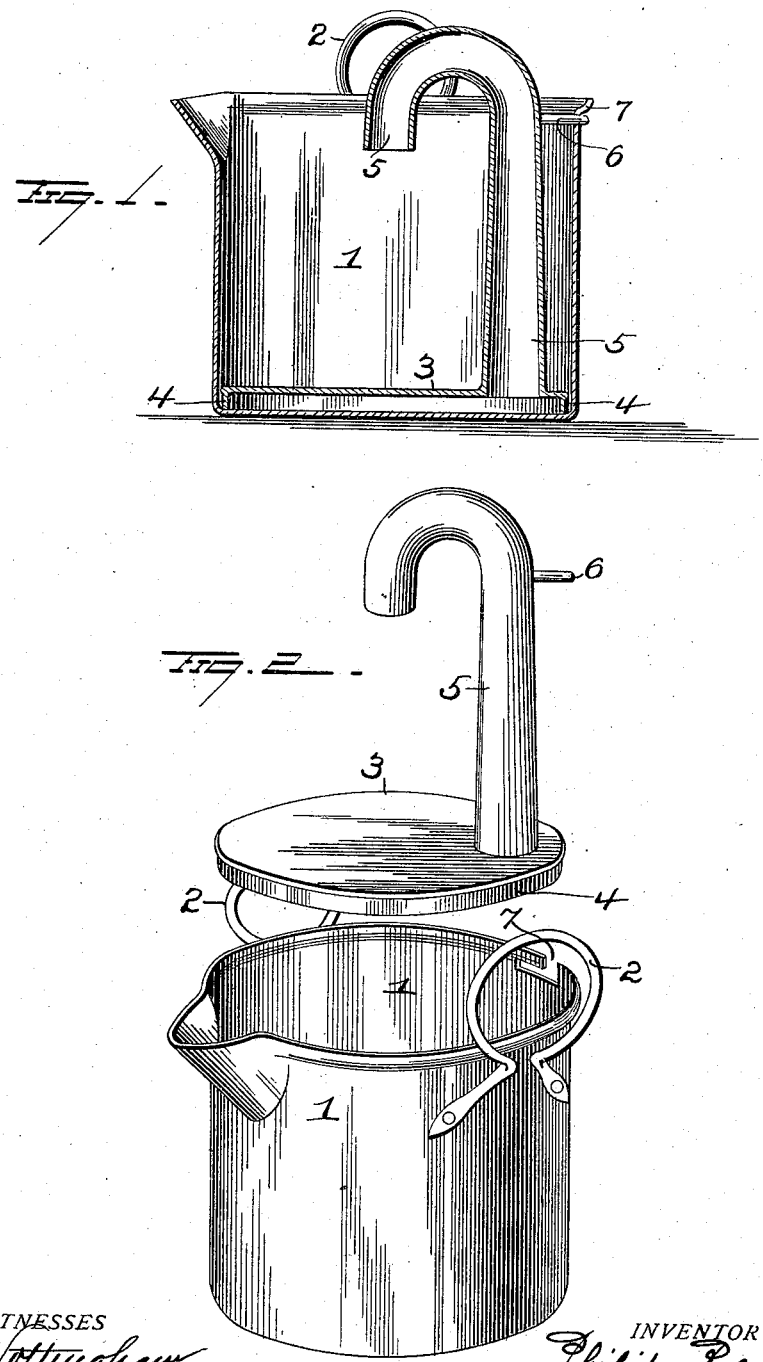

PHILIP RAHM, OF NEW ORLEANS, LOUISIANA, ASSIGNOR OF ONE-HALF TO CHARLES REYMERSHOFFER, OF GALVESTON, TEXAS.

DOMESTIC BOILER.

No. 867,598.　　　Specification of Letters Patent.　　　Patented Oct. 8, 1907.

Application filed April 28, 1906. Serial No. 314,218.

*To all whom it may concern:*

Be it known that I, PHILIP RAHM, a resident of New Orleans, in the parish of Orleans and State of Louisiana, have invented certain new and useful Improvements in Domestic Boilers; and I do hereby declare the following to be a full, clear, and exact description of the invention, such as will enable others skilled in the art to which it appertains to make and use the same.

My invention relates to improvements in domestic boilers, the object of the invention being to provide an improved boiler for milk, cocoa, or other liquids liable to boil over, and which will absolutely prevent any liquid from boiling over the top of the receptacle but permit said liquid to boil for an indefinite length of time and at any temperature without danger of boiling over, and with this object in view, the invention consists in certain novel features of construction and combinations and arrangements of parts as will be more fully hereinafter described and pointed out in the claims.

In the accompanying drawings, Figure 1 is a perspective view illustrating my improvements and Fig. 2 is a view in vertical section.

1 represents a pot or receptacle of any kind, and in fact any form of cooking utensil may be employed, the pot shown being of general cylindrical form having handles 2 at its sides.

3 represents the base portion of my improved device, which is preferably made of a size and shape to loosely fit the interior of the receptacle 1 and made with a depending annular flange 4 supporting the base above the bottom of the receptacle and providing a chamber for the liquid of sufficient depth to prevent burning.

Secured to base 3 and communicating with an opening therein, is an approximately vertical tube 5, preferably, although by no means essentially, decreasing in diameter from its lower end upward, and bent into goose-neck form at its upper end, to direct the boiling liquid back into the receptacle. This tube 5 near its upper end, is provided with a pin 6, adapted to enter an angular notch 7 in the receptacle 1, to hold the tube therein, but this pin 6 is ordinarily not caught in the horizontal part of the notch when the boiler is in use, as it is desirable to permit the device to rise and fall as the liquid boils.

In operation, the liquid which would otherwise boil over, flows up the tube 5 and is discharged thereby back into the receptacle and this continues for an indefinite length of time, absolutely preventing any overflow regardless of the temperature at which the liquid is boiled.

A great many slight changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

The combination with a utensil having an angular slot in the upper edge of its wall, of a device for preventing the boiling over of liquids comprising a flat base or disk provided with a shallow depending portion for supporting it near the bottom of the utensil, said base or disk having a hole near its edge, an upwardly projecting pipe supported by the base or disk near the edge thereof and communicating with the hole therein, the upper end of said pipe being bent to discharge downwardly into the utensil in which the device may be located, and a pin projecting laterally from said pipe to enter the angular slot in the wall of the utensil.

In testimony whereof, I have signed this specification in the presence of two subscribing witnesses.

PHILIP RAHM.

Witnesses:
JOHN A. DOODENNE,
VICTOR LE BEAN.